United States Patent
Liao et al.

(10) Patent No.: US 7,709,882 B2
(45) Date of Patent: May 4, 2010

(54) STORAGE DEVICE WITH CHARGE TRAPPING STRUCTURE AND METHODS

(75) Inventors: Hang Liao, Corvallis, OR (US); Zhizhang Chen, Corvallis, OR (US); Alexander Govyadinov, Corvallis, OR (US); Leslie Louis Szepesi, Jr., Salem, OR (US); Heon Lee, Pohang-Si (KR)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 11/255,458

(22) Filed: Oct. 20, 2005

(65) Prior Publication Data

US 2006/0086986 A1 Apr. 27, 2006

Related U.S. Application Data

(62) Division of application No. 10/689,940, filed on Oct. 20, 2003, now Pat. No. 6,984,862.

(51) Int. Cl.
*H01L 29/788* (2006.01)
(52) U.S. Cl. .................................... 257/316
(58) Field of Classification Search ......... 257/314–326; 365/185.15, 185.14, 185.11, 185.22; 369/100, 369/101
See application file for complete search history.

(56) References Cited

U.S. PATENT DOCUMENTS 5,307,311 A  4/1994 Sliwa, Jr.
5,477,072 A * 12/1995 Goo .......................... 257/316
5,557,596 A *  9/1996 Gibson et al. ............... 369/101
5,835,477 A 11/1998 Binnig et al.
6,122,191 A *  9/2000 Hirose et al. ........... 365/185.01
2004/0042268 A1*  3/2004 Bhattacharyya ........ 365/185.08

FOREIGN PATENT DOCUMENTS

| DE | EP 0 734 017 | * 3/1996 |
| EP | 0 289 642 | 11/1988 |
| EP | 0 734 017 | 9/1996 |
| EP | 1 211 680 | 6/2002 |
| EP | 1 227 496 | 7/2002 |
| JP | 56 165943 | 4/1982 |

OTHER PUBLICATIONS

"Movable Micro-Electromechanical Device"; Walmsley, et al; USPTO U.S. Appl. No. 10/157,254, filed May 28, 2002; 36 pages.

* cited by examiner

*Primary Examiner*—Dao H Nguyen
*Assistant Examiner*—Tram H Nguyen

(57) ABSTRACT

A storage device includes a first semiconducting layer having a p-dopant and a second semiconducting layer having an n-dopant, disposed on the first semiconducting layer forming a junction between the first and the second semiconducting layers. The storage device also includes a charge trapping structure disposed on the second semiconducting layer and a conductive gate, wherein the conductive gate and the charge trapping structure move relative to the other, wherein an electric field applied across the second semiconducting layer and the conductive gate traps charge in the charge trapping structure.

9 Claims, 9 Drawing Sheets

STORAGE DEVICE WITH CHARGE TRAPPING STRUCTURE AND METHODS

CROSS-REFERENCE TO RELATED APPLICATIONS

This application is a divisional application and claims the benefit and priority of U.S. patent application Ser. No. 10/689,940 filed Oct. 20, 2003 now U.S. Pat. No. 6,984,862.

BACKGROUND

Description of the Art

Over the past few years, the demand for ever cheaper and lighter weight portable electronic devices has led to a growing need to manufacture durable, lightweight, and low cost electronic circuits including high density memory chips. Solid state memory devices, typically, have read write speeds on the order of nanoseconds, however, storage capacities of only a few hundred Megabytes are typically achieved. On the other hand, mass storage devices, which usually have a rotating medium, have the capability of storing multiple Gigabytes of data; however, they have read write speeds of the order of only milliseconds.

The ability to manufacture high capacity storage systems is typically constrained by the need to utilize movable or rotating parts, which is a relatively slow process compared to electronic circuit technology. In addition, reliability is a further problem, in order to decrease the read write times the movable or rotating parts tend to be utilized at as high a speed as possible. Further, if the electronic device is used in a portable application the shock resistance of the system is also typically a limitation. Power consumption, overall weight and size, and cost also are factors that limit storage systems.

To a large extent, silicon based memory devices, over the past thirty years, have contributed to a nearly constant exponential increase in the capabilities of microelectronic devices; producing unprecedented advances in computational, telecommunication, and signal processing capabilities. In turn, this increase in complexity has driven a corresponding decrease in the feature size of integrated circuit devices, which has typically followed "Moore's Law." However, the continued decrease in feature size of integrated circuits, into the nanometer regime, has become increasingly more difficult, and may be approaching a limit, because of a combination of physical and economic reasons. Generally, silicon based memory devices involve complex architectures utilizing many layers. Each of these layers must be deposited and defined to produce the desired structure for that layer, thus each layer contributes to a higher cost for the semiconductor device. In addition, such complex architectures, typically, result in a reduction in the number of logic cells per unit area of the semiconductor substrate, leading to a reduction in the data storage density for a given chip size.

It is well recognized in the field of data storage that it is desirable to increase the storage density and reduce the cost of information stored in the storage device. This is generally true for all types of information storage devices, such as magnetic hard drives, optical drives, random access memory devices, and other information storage systems. As noted above it becomes increasingly difficult to squeeze more information into the storage devices.

If these problems persist, the continued growth, seen over the past several decades, in cheaper, higher speed, higher density, and lower power storage devices used in electronic devices will be impractical.

DESCRIPTION OF THE PREFERRED EMBODIMENTS

The present embodiments of this invention are directed to memory storage devices utilizing a charge trapping structure. The bit size of current solid state memory devices generally is limited by the dimensions capable of being resolved by the various photolithography technologies being utilized. The present invention utilizes a nano-scale conductive tip as a gate to control the localized charging and discharging of the charge trapping structure. In addition, in the present invention the nano-scale conductive tip and the charge trapping structure move relative to each other. The bit size of the present invention is not limited by photolithographic resolution but is generally determined by the size of the tip. Data may be read from and written to storage locations using the nano-scale conductive tip as a control gate. Accessing a specific storage location typically involves displacing the tip in either one or two dimensions.

Figure 1B:
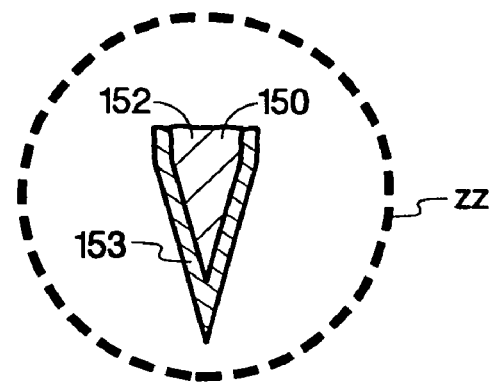
FIG. 1b is an expanded cross-sectional view of a conductive gate tip according to an alternate embodiment of the present invention.
Figure 1A:
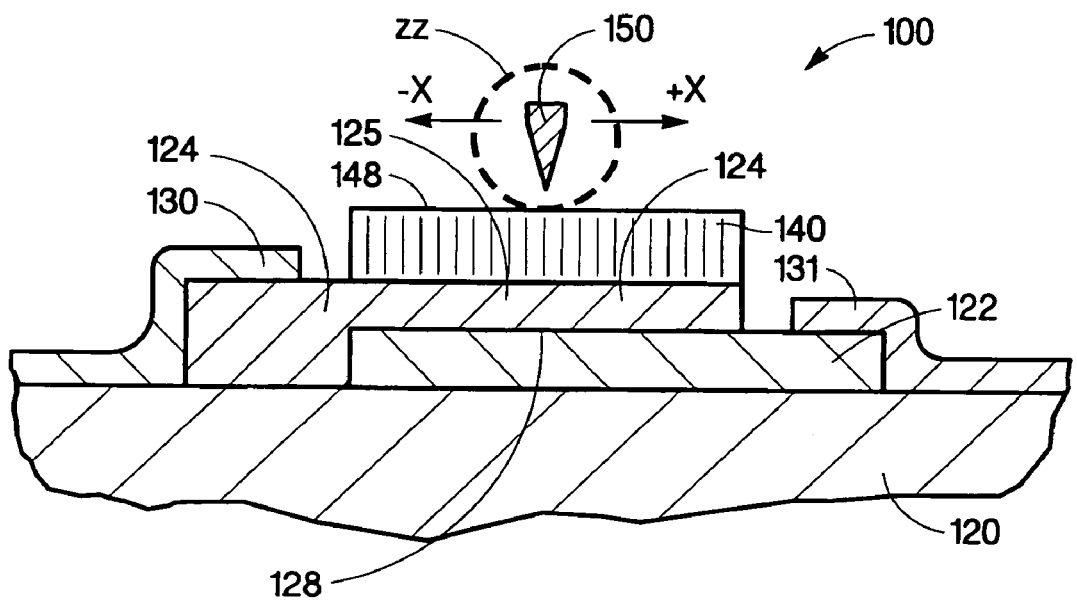
FIG. 1a is a cross-sectional view of a storage device according to an embodiment of the present invention.

An embodiment of memory storage device 100 of the present invention is shown in FIG. 1a, in a simplified cross-sectional view. In this embodiment, first semiconducting layer 122 is disposed on substrate 120 with at least a portion of second semiconducting layer 124 disposed on first semiconducting layer 122 forming junction 128. First semiconducting layer 122 includes a p type dopant doped at a specified concentration, and second semiconducting layer 124 includes an n type dopant also doped at a specified concentration. The particular dopant materials and the dopant concentrations utilized will depend on various factors, such as the junction dimensions as well as the particular charge trapping material utilized in memory storage device 100. Electrical contact is made to the two semiconducting layers via n contact 130 and p contact 131. Contacts 130 and 131 may be formed utilizing any of the conventional metal contacts utilized in semiconductor processing. For example, aluminum and its various alloys, platinum, titanium, or tungsten as well as various metal silicides are just a few examples of the materials that may be utilized to form contacts 130 and 131.

Memory storage device 100 further includes charge trapping structure 140 that is disposed on a portion of second semiconducting layer 124. In addition, memory storage device 100 also includes conductive gate tip 150 disposed over charge trapping structure 140. Conductive gate tip 150, in this embodiment, is a metal or semiconductor tip formed utilizing a wide variety of metals or semiconductors such as tungsten, gold, platinum, palladium, rhenium, tantalum, silicon, gallium arsenide, or cadmium sulfide to name just a few materials that may be used. In alternate embodiments, as shown in an expanded cross-sectional view in FIG. 1b, conductive gate tip 150' may include base 152 and outer layer 153 disposed or formed on the outer surface of base 152. In one embodiment, base 152 may be formed utilizing any conductive material that provides sufficient conductivity to either generate a data bit or read a data bit such as a metal, a doped semiconductor, or an organic conductor. Outer layer 153 may be formed utilizing from any dielectric or electrically insulating layer. Examples of such dielectric materials that may be utilized include, but are not limited to, oxides, nitrides, carbides, borides as well as organic and polymeric dielectric layers. In a second embodiment, both base 152 and outer layer 153 may be formed utilizing a conductor as described above. For example, base 152 may be formed utilizing one metal such as aluminum, titanium, copper, or tungsten, and outer layer 153 may be formed utilizing a different metal such as gold, platinum, or palladium. In still other embodiments, base 152 may be formed utilizing a dielectric material such as silicon oxide or silicon nitride to name just a couple of examples of the wide range dielectric materials, including high dielectric constant materials, that may be used. Outer layer 153, in this embodiment, may be formed over the dielectric material forming base 152 utilizing any conductive material that provides sufficient conductivity to either generate a data bit or read a data bit. In addition, conductive gate tip 150 and 150' may be formed in a wide variety of shapes, for example, what is generally referred to as a "Spindt" tip may be used, or a trapezoidal shaped atomic force microscope tip formed at the end of a cantilever also may be utilized. Generally, the end of the tip closest to the charge trapping structure will be anywhere from a few atoms to a few nanometers in size. In addition, the particular shape of the conductive gate tip will depend on the desired field generated between the conductive gate tip and second semiconducting layer 124 to produce the desired shape and size of the charged bit formed in the charge trapping structure.

In one embodiment, conductive gate tip 150 is moveable or scannable relative to and over charge trapping structure surface 148 in at least one direction. In alternate embodiments, charge trapping structure 140 may be moved relative to conductive gate tip 150. In still alternative embodiments, either conductive gate 150 or charge trapping structure 140, or both are translatable or scannable in two-dimensions. Data may be read from and written to storage locations (not shown) using conductive gate tip 150. Accessing a particular storage location involves displacing conductive gate tip 150 in the X or Y direction or in both directions. For purposes of illustration and clarity only, FIG. 1a and various other figures to be described include rectilinear coordinate axes. These axes are arbitrary, and it should be understood that the systems described herein may be described in terms of any other reference frame.

It should be noted that the drawings are not true to scale. Further, various elements have not been drawn to scale. Certain dimensions have been exaggerated in relation to other dimensions in order to provide a clearer illustration and understanding of the present invention.

In addition, although some of the embodiments illustrated herein are shown in two dimensional views with various regions having depth and width, it should be clearly understood that these regions are illustrations of only a portion of a device that is actually a three dimensional structure. Accordingly, these regions will have three dimensions, including length, width, and depth, when fabricated on an actual device. Moreover, while the present invention is illustrated by various embodiments, it is not intended that these illustrations be a limitation on the scope or applicability of the present invention. Further it is not intended that the embodiments of the present invention be limited to the physical structures illustrated. These structures are included to demonstrate the utility and application of the present invention to presently preferred embodiments.

Substrate 120, in this embodiment, may be formed from any of a wide range of materials or combinations of materials, such as various glasses, for example, any of the borosilicate, soda lime or quartz glasses (including crystalline and amorphous forms); materials such as silicon oxide including silicon dioxide or silicon oxynitride, or silica mixed with oxides of, for example, potassium, calcium, barium or lead; ceramics such as aluminum oxide, boron nitride, silicon carbide, and sapphire; metals; semiconductors such as silicon, gallium arsenide, indium phosphide, and germanium; and various polymers such as polycarbonates, polyethylene terephthalate, polystyrene, polyimides, and acrylates including polymethylacrylate are just a few examples of the materials that may be utilized. Accordingly, the present invention is not intended to be limited to those devices fabricated in silicon semiconductor materials, but includes those devices fabricated in one or more of the available semiconductor materials and technologies known in the art, such as thin-film-transistor (TFT) technology using polysilicon on glass substrates. Further, substrate 120 is not restricted to typical wafer sizes, and may include processing a polymer sheet or film or glass sheet or, for example, a single crystal sheet or a substrate handled in a different form and size than that of conventional wafers or substrates. The actual substrate material utilized will depend on various system components such as the particular semiconductor layers and dopants utilized, the particular charge trapping structure utilized, as well as the desired voltage, power, and read/write/erase speed parameters utilized. In addition, for those embodiments utilizing a conductive or semiconductive substrate, a dielectric layer will also be disposed between the substrate and the first and second semiconducting layers to provide electrical isolation.

First and second semiconducting layers 122 and 124, in this embodiment, may be formed from any of a wide range of semiconducting materials or combinations of such materials. For example, first semiconducting layer 122 may be a p doped epitaxial silicon layer and second semiconducting layer 124 may be an n doped epitaxial silicon layer. In addition different semiconducting materials also may be utilized for each layer, for example, first semiconducting layer 122 may be a p doped epitaxial germanium layer and second semiconducting layer 124 may be an n doped epitaxial layer. Further, variations in crystallinity also may be utilized, for example first semiconducting layer 122 may be a p doped polycrystalline silicon layer and second semiconducting layer 124 may be an n doped amorphous silicon layer. In this manner many different combinations of materials and crystallinity as well as doping concentrations may be utilized. Thus, first and second semiconducting layers 122 and 124 may be formed utilizing any of the wide range of inorganic semiconducting materials available including materials such as silicon, gallium arsenide, germanium, indium phosphide to name just a few. The particular semiconducting materials utilized will depend on various system components such as the particular substrate and dopants utilized, the particular charge trapping structure utilized, as well as the desired voltage, power, and read/write/erase speed parameters utilized.

Charge trapping structure 140, in this embodiment, may be formed from any of a wide range of inorganic and organic dielectric materials capable of storing or holding a localized charge. For example, inorganic dielectric materials such as silicon oxides, silicon nitrides, or silicon carbides to name just a few materials that may be utilized to form charge trapping structure 140. In one embodiment, charge trapping structure 140 includes a three layer structure of a silicon dioxide layer disposed on second semiconducting layer 124 with a thin silicon nitride layer deposited on the silicon dioxide layer and a second silicon dioxide layer deposited on the silicon nitride layer. In another embodiment, charge trapping structure includes germanium nano-particles dispersed in a silicon dioxide layer. In still other embodiments, other nanoparticles such as gold, cadmium sulfide, or silicon also may be dispersed in silicon dioxide or any other suitable inorganic or organic dielectric material. And in still other embodiments, multilayer structures using silicon dioxide and silicon nitride also may be utilized to form charge trapping structure 140. The particular charge trapping material and structure used will depend on various system components such as the particular semiconductor layers and dopants utilized, the particular substrate utilized, as well as the desired voltage, power, and read/write/erase speed parameters utilized.

Figure 2:
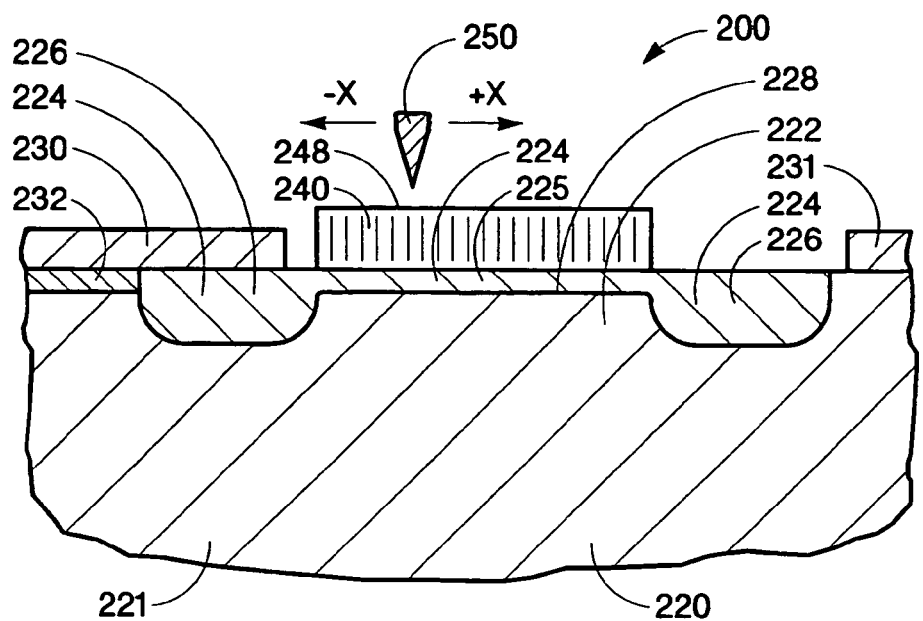
FIG. 2 is a cross-sectional view of a storage device according to an alternate embodiment of the present invention.

An alternate embodiment of a memory storage device of the present invention is shown in FIG. 2, in a simplified cross-sectional view. In this embodiment, first semiconducting layer 222 is a p+ region formed within p doped 221 silicon substrate 220 and second semiconducting layer 224 includes n wells 226 and substantially planar n doped region 225 forming junction 228. The particular dopant materials and the dopant concentrations utilized will depend on various factors, such as the junction dimensions as well as the particular charge trapping material utilized in memory storage device 200. In this embodiment, silicon substrate 220 is a monocrystalline silicon substrate having a thickness of about 300-800 micrometers. In alternate embodiments, the substrate may be formed from a wide range of semiconductor materials including gallium arsenide, indium phosphide, and germanium to name a few. Electrical contact is made to the two semiconducting layers via n contact 230 and p contact 231. Insulating layer 232 electrically isolates n contact 230 from silicon substrate 220. Contacts 230 and 231 may be formed utilizing any of the conventional metal contacts utilized in semiconductor processing as described above for the embodiment shown in FIGS. 1a and 1b.

Memory storage device 200 further includes charge trapping structure 240 that is disposed on substantially planar n doped region 225 of second semiconducting layer 224. In addition, memory storage device 200 also includes conductive gate tip 250 disposed over charge trapping structure 240. In one embodiment, conductive gate tip 250 is moveable or translatable relative to and over charge trapping structure surface 248 in at least one direction. In alternative embodiments, charge trapping structure 240 may be moved relative to conductive gate tip 250. In still other embodiments, either conductive gate 250 or charge trapping structure 240, or both are translatable in one or two-dimensions. Data may be read from and written to storage locations (not shown) using conductive gate tip 250. Charge trapping structure 240 and conductive gate tip 250 may utilize any of the materials and structures described above for the embodiment shown in FIGS. 1a and 1b. Further, in this embodiment, conductive gate tip 250 is disposed over and not in contact with charge trapping structure 240, however, in alternate embodiments, conductive gate tip may be in sliding contact with charge trapping structure 240.

Figure 3:
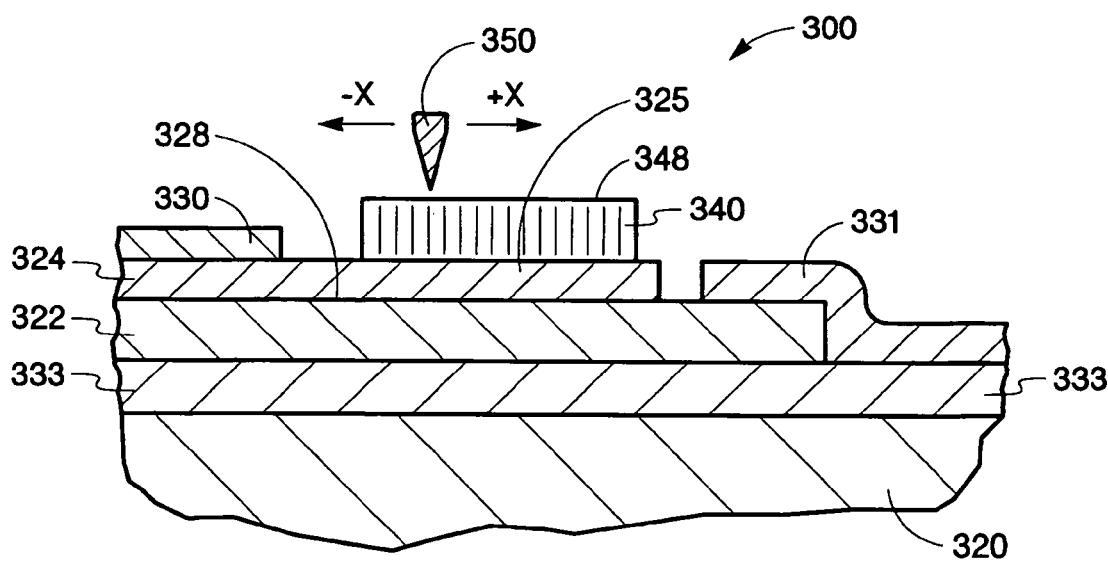
FIG. 3 is a cross-sectional view of a storage device according to an alternate embodiment of the present invention.

An alternate embodiment of a memory storage device of the present invention is shown in FIG. 3, in a simplified cross-sectional view. In this embodiment, first semiconducting layer 322 is a p+ epitaxial layer formed on silicon oxide layer 333 formed on substrate 320. Second semiconducting layer 324 is an n doped epitaxial layer formed on first semiconducting layer 322 forming junction 328. In this embodiment, substrate 320 is formed from a silicon wafer, however, in alternate embodiments, any of the wide range of semiconductor wafers and materials available also may be utilized such as gallium arsenide and germanium to name just two alternatives. In addition, in this embodiment, insulating layer 333 is silicon oxide, however, in alternate embodiments, any of the wide range of dielectric materials such as silicon nitride, silicon carbide, boron nitride, and aluminum oxide, as well as combinations of these materials, and multilayer structures containing various dielectric materials also may be utilized. The particular dopant materials and the dopant concentrations utilized will depend on various factors, such as the junction dimensions the particular charge trapping material utilized in memory storage device 300, as well as the particular tip structure utilized, and the localized field desired. Electrical contact is made to the two semiconducting layers via n contact 330 and p contact 331. Contacts 330 and 331 may be formed utilizing any of the conventional metal contacts utilized in semiconductor processing as described above for the embodiments shown in FIGS. 1 and 2.

Memory storage device 300 further includes charge trapping structure 340 that is disposed on substantially planar n doped region 325 of second semiconducting layer 324. In addition, memory storage device 300 also includes conductive gate tip 350 disposed over charge trapping structure 340. Conductive gate tip 350 and charge trapping structure 340 move or translate relative to each other in at least one direction as described in the embodiments shown in FIGS. 1 and 2, so that conductive gate tip 350 may be positioned over a desired location of charge trapping structure surface 348. In addition, charge trapping structure 340 and conductive gate tip 350 may utilize any of the materials and structures described above.

Figure 4A:
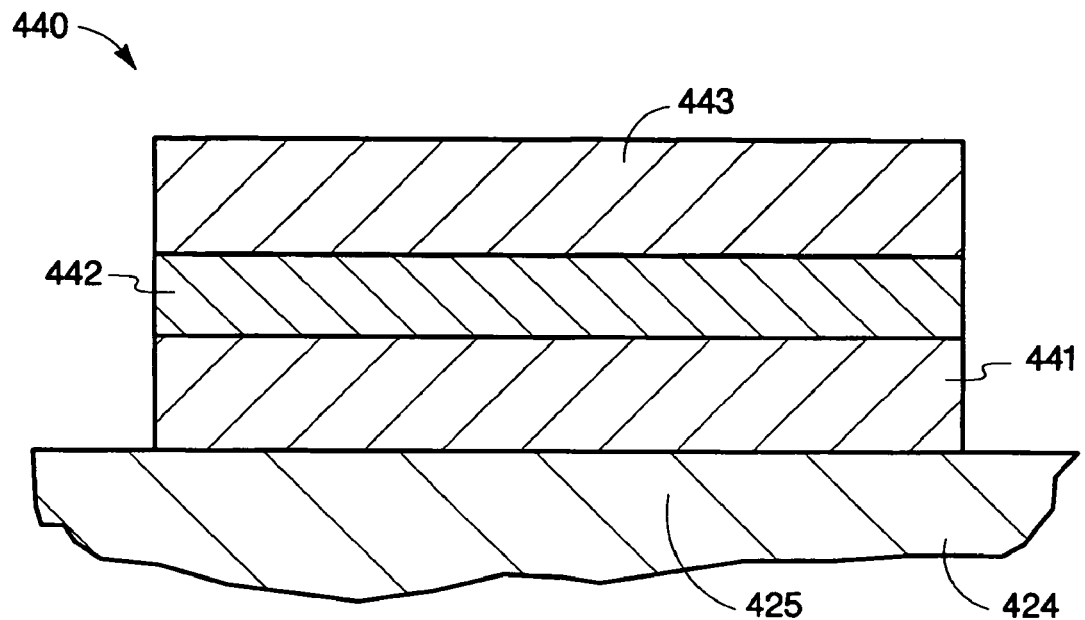
FIG. 4a is cross-sectional view of a charge trapping structure according to an embodiment of the present invention.
Figure 4B:
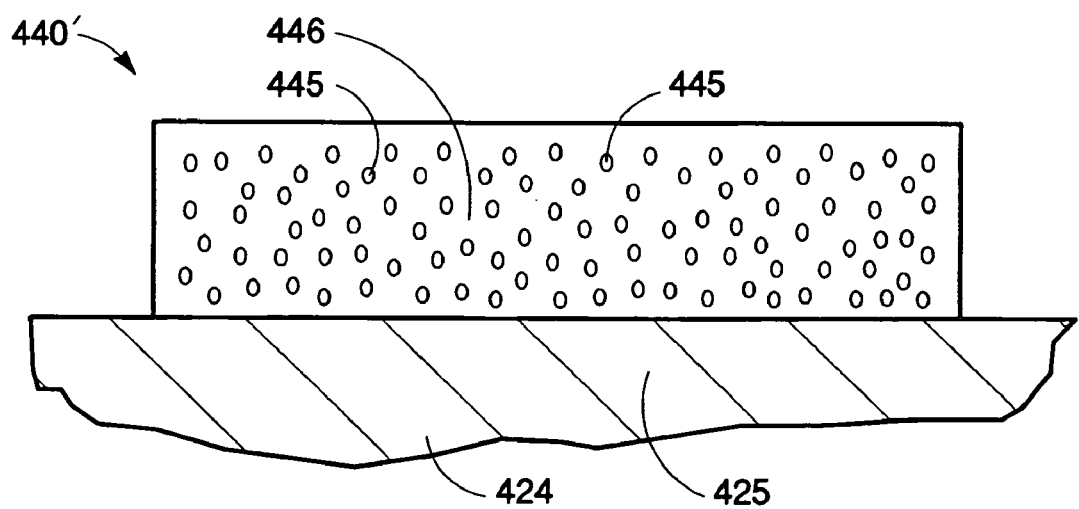
FIG. 4b is cross-sectional view of a charge trapping structure according to an alternate embodiment of the present invention.

Alternate embodiments of the charge trapping structure that may be utilized in a memory storage device of the present invention are shown in FIGS. 4a and 4b, in expanded cross-sectional views. As illustrated in FIG. 4a, charge trapping structure 440 includes first dielectric layer 441 disposed on substantially planar n doped region 425 of second semiconducting layer 424. Second dielectric layer 442 is disposed on first dielectric layer 441 and third dielectric layer 443 is disposed on second dielectric layer 442. In this embodiment, first and third dielectric layers 441 and 443 are silicon dioxide layers and second dielectric layer 442 is a silicon nitride layer. In alternate embodiments, any of a wide range of dielectric materials also may be utilized. For example, various combinations of inorganic and organic layers as well as charge trapping structures containing only organic or only inorganic layers may be utilized. Further, in still other embodiments, a single, dual, or multiple layers also may be utilized to form the charge trapping structure. Charge trapping structure 440', as illustrated in FIG. 4b, includes nano-particles 445 dispersed or embedded in a dielectric medium. In one embodiment, charge trapping structure 440' includes germanium nano-particles dispersed within a silicon dioxide medium 446 with the silicon dioxide medium disposed on substantially planar n doped region 425 of second semiconducting layer 424. However, in alternate embodiments, conductive, semiconductive, or insulating nano-particles dispersed within a dielectric medium also may be utilized. For example gold nano-particles may be dispersed within a silicon oxide medium, or cadmium sulfide nano-particles may be dispersed within a polyimide or polycarbonate medium.

Figure 5:
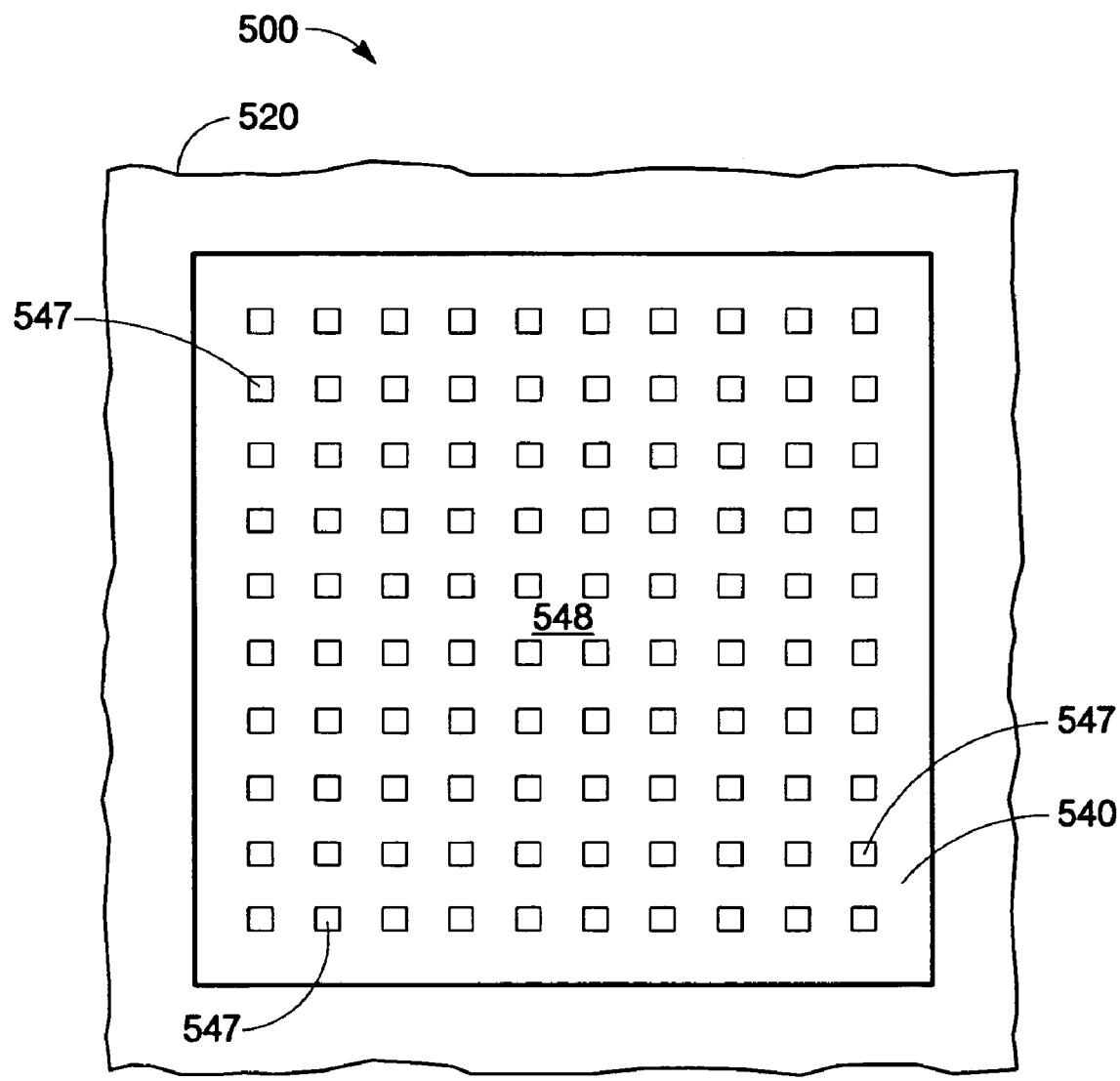
FIG. 5 is a top plan view of a charge trapping structure according to an embodiment of the present invention.

A top plan view of memory storage device 500 is shown in FIG. 5 illustrating the multiple storage locations that may be generated and formed on one charge trapping structure. In FIG. 5, for simplicity, charge trapping structure 540 is illustrated on top of substrate 520. Multiple storage locations 547 are illustrated as squares on charge trapping structure surface 548. The particular shape of the storage locations will depend on many factors such as the shape of the tip and the field density generated between the conductive gate tip (not shown) and second semiconductor layer (not shown) as well as whether the storage location is generated while the tip is moving over charge trapping structure surface 548 or the tip is stationary, thus, the choice of a square to represent a storage location is for illustrative purposes only.

Figure 6A:
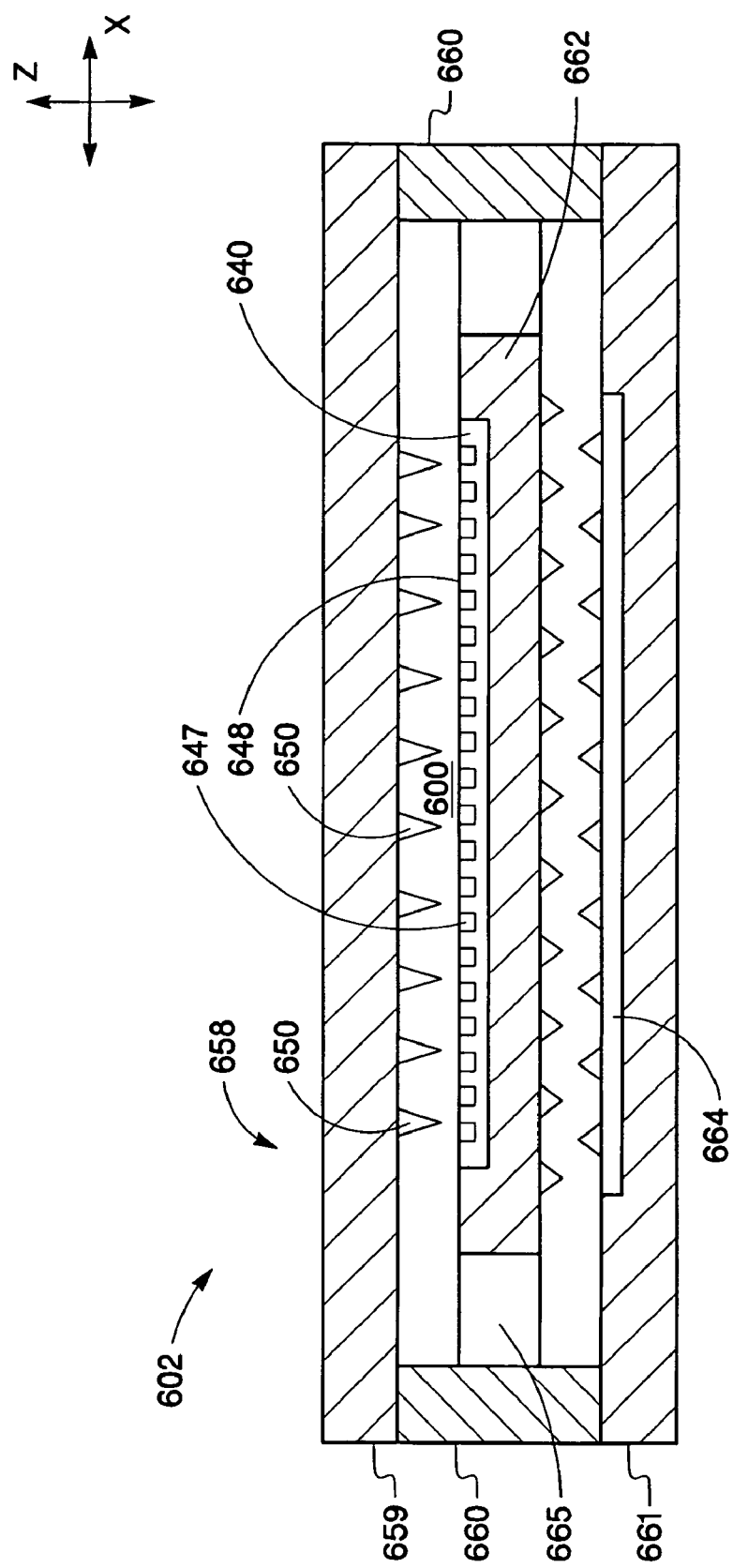
FIG. 6a is a schematic cross-sectional view of a computer memory storage system according to an embodiment of the present invention.

A computer memory storage system utilizing a nano-scale conductive tip as a gate to generate localized charge in a charge trapping structure is shown in a schematic cross-sectional view in FIG. 6a. In this embodiment, computer memory storage system 602 includes memory storage device 600 disposed within frame 658. Frame 658 includes conductive gate support or tip support 659, moving layer support 660 and drive support 661. Moving layer support 660, is connected to micromover 662 that is mechanically suspended between tip support 659 and drive support 661. Typically tip support 659, moving layer 660 and driver support 661 are substantially planar and arranged essentially parallel to each other. In this embodiment, micromover 662 includes charge trapping structure 640 and as previously illustrated in FIG. 5 (i.e. charge trapping layer 540) charge trapping structure 640 includes a plurality of data storage locations 647 accessible through operation of a read/write device connected to frame 658. As noted earlier data may be read from and written to storage locations 647 using conductive gate tips 650 attached to or formed in or on tip support 659 of frame 658. In alternate embodiments, conductive gate tips 650 may be attached to or formed on or in micromover 662 with charge trapping structure 640 attached to or formed on tip support 659. In still other embodiments, tip support 659 also may include a micromover in which case both the conductive gate tips and the charge trapping structure would be moveable independent of each other. Accessing a specific storage location 647 typically involves displacing micromover 662 in either the X, or the Y, or both directions from a resting position, relative to frame 658.

Computer memory storage system 602 also typically includes an actuator, such as electrostatic drive 664, to generate forces which produce relative movement between frame 658 and micromover 662. The forces may be generated via application of voltages to electrodes located on frame 658 and/or micromover 662. The applied voltages create forces of attraction, repulsion, or both between frame 658 and micromover 662. These forces, typically, include X and Y components, so as to cause relative movement to occur in the X-Y plane, though in many cases, the drive will also produce forces having a Z-axis component. To allow X-Y planar motion while substantially limiting Z-axis motion, it will often be desirable to configure the suspension to have a relatively low in plane stiffness (e.g. in the X-Y plane), and a relatively high out-of-plane stiffness (e.g. along the Z-axis. Suspension 665 is provided to hold micromover 662 in its planar orientation relative to tip support 659 and drive support 661 (e.g. parallel to the X-Y plane), and to connect micromover 662 to frame 658. Suspension 665, typically, includes one or more spring like structures. These structures, typically, are configured to allow planar displacement of micromover 662 from a resting position while substantially limiting out-of-plane movement of micromover 662 relative to frame 658.

Figure 6B:
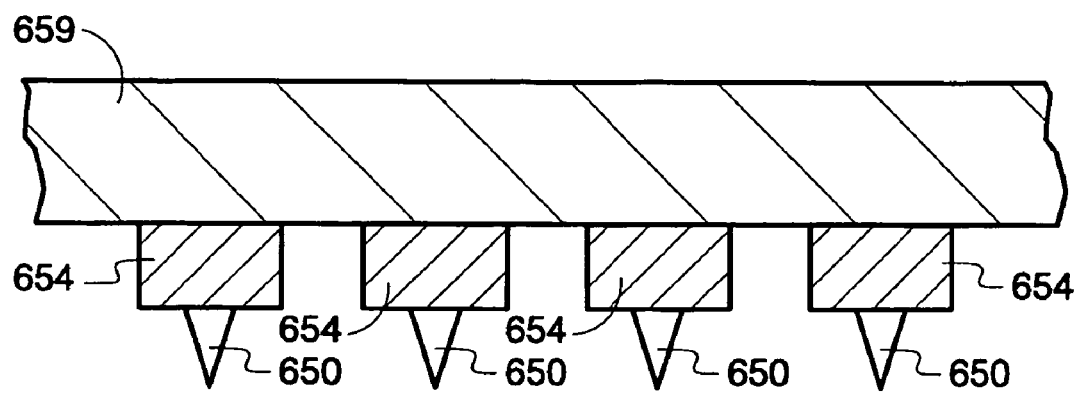
FIG. 6b, is a schematic cross-sectional view of a tip actuator according to an alternate embodiment of the present invention.

Computer memory storage system 602 also may include tip actuator 654 coupled to conductive gate tip 650 as shown, in an alternate embodiment, in a schematic cross-sectional view in FIG. 6b. Tip actuator 654, in this embodiment, provides height control, of the tip over charge trapping structure 640 (see FIG. 6a), in the Z axis. In one alternative embodiment, tip actuator 654 provides movement of the tip in three mutually perpendicular directions. In still other embodiments, tip actuator 654 may be formed on or within tip support 659 with multiple tips coupled to a tip actuator. Such an arrangement provides for one set or group of tips to provide the electric field to generate data storage locations 647 while another set or group of tips are utilized to monitor, read, or access data storage locations 647 by measuring, for example, the tunneling current over a predetermined area of charge trapping structure 640. For illustrative purposes only tip actuator 654 is shown as a block attached to tip support 659. Tip actuator 654 may be formed on, attached to, or formed within tip support 659 depending on the particular actuation technique utilized such as piezoelectric structures or an electrostatic drive. Tip actuator, in this embodiment, may utilize any of the wide variety of micromover or micro-actuator techniques known in the art. The particular actuator utilized will depend on various factors such as the number of axes of movement desired, the range of movement desired, the type of tip utilized, and the function (i.e. read or write or both) the tip is to perform.

Figure 7:
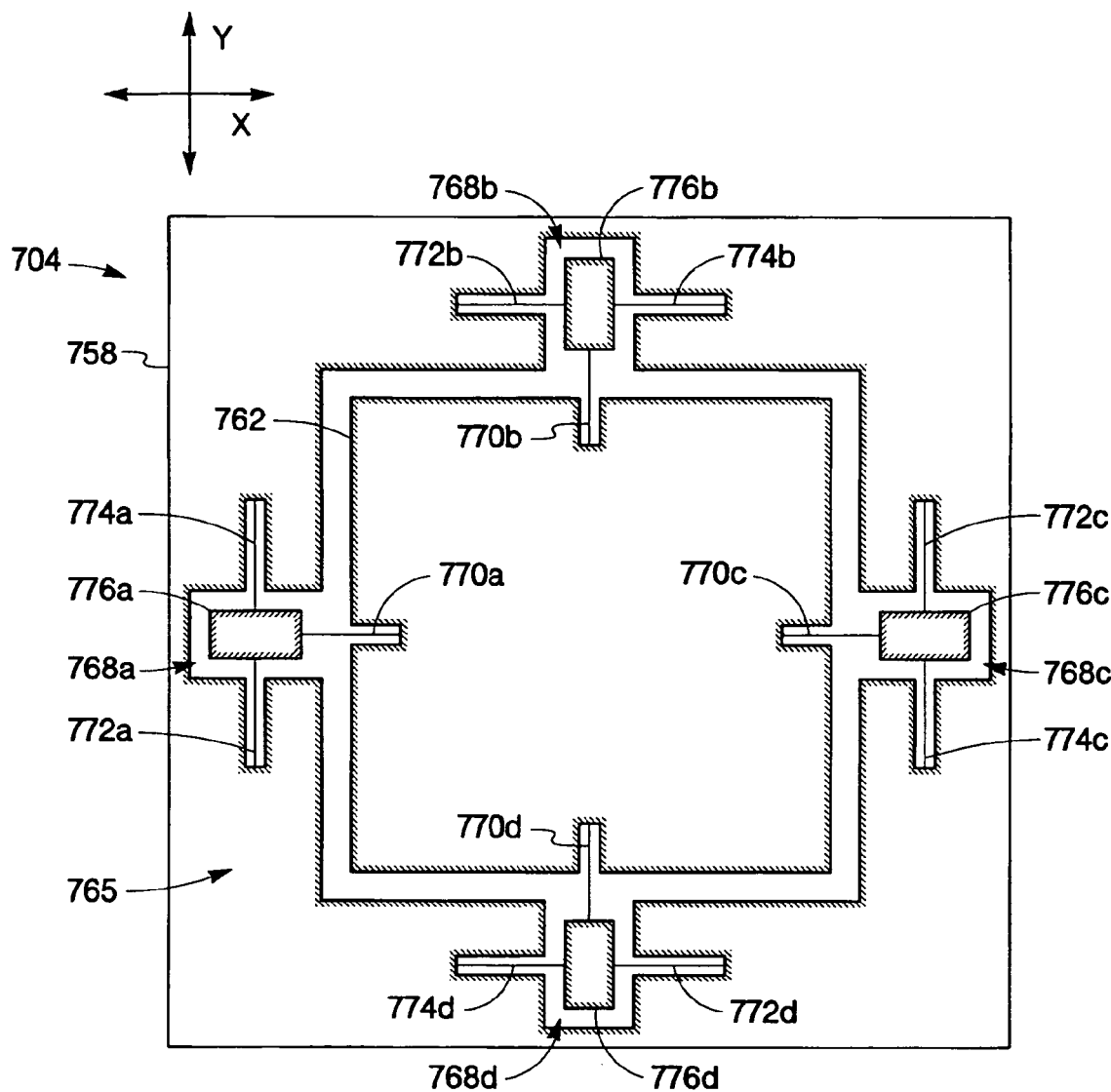
FIG. 7 is a schematic plan view of a moveable system according to an embodiment of the present invention.

An embodiment of a micromover mechanism of the present invention is shown, in a schematic plan view of, in FIG. 7. In this embodiment, micromover mechanism 704 includes mechanical suspension 765 interconnecting frame 758 and micromover 762. Mechanical suspension 765 typically includes a plurality of suspension sub-assemblies or units 768 (individually designated 768a, 768b, 768c, and 768d), that are arrayed about micromover 762 suspending the micromover relative to the frame. Typically, frame 758 and micromover 762 are substantially planar and are configured so that micromover 762 has an operative range of planar X-Y motion within frame 758. Micromover 762 may be displaced relative to frame 758 using an electrostatic drive, as described above, or through operation of any other suitable actuating mechanism. In this embodiment, mechanical suspension 765 utilizes four suspension sub-assemblies 768 arranged symmetrically about frame 758 and operatively disposed between frame 758 and micromover 762. In alternate embodiments, one, two or three suspension sub-assemblies, as well as more than four sub-assemblies also may be utilized.

Suspension unit 768a typically includes flexures 770a, 772a, and 774a, with the other suspension units having corresponding similar flexures as illustrated in FIG. 7. As used herein, "flexure" may refer to any spring like structure connecting micromover 762 to frame 758, that flexes in response to relative movement between the micromover and the frame. Typically, the flexures have a relatively low in-plane stiffness (thus permitting planar X-Y motion) and relatively high out-of-plane stiffness (thus substantially limiting out-of-plane Z-axis motion). In the absence of X-Y forces, the flexures typically are configured to urge the micromover 762 into a resting or equilibrium position. In many cases, it will be desirable to form the flexures integrally with the other components of computer memory storage device 702, using deep reactive ion-etching, wet etching, or other fabrication techniques such as laser ablation or ion milling. In alternate embodiments, the flexures may be formed separately and then secured to the mover and frame. In FIG. 7, the flexures are depicted as lines for the sake of clarity, though it should be understood that the flexures have a non-zero thickness.

As illustrated in FIG. 7 flexures 770a, 770b, 770c and 770d are respectively coupled between micromover 762 and coupling members 776a, 776b, 776c, and 776d. Because these flexures are connected directly to micomover 762, they may be referred to as "mover flexures." The remaining flexures (772a, 774a, 772b, 774b, 772c, 774c, 772d, and 774d) are respectively coupled between interconnecting frame 758 and coupling members 776a, 776b, 776c, and 776d. Because they connect frame 758 to a coupling member, these remaining flexures may be referred to as "frame flexures." The various flexures may be further distinguished in terms of their response to applied forces and the resulting relative movement between the micromover and the frame. In particular, flexures that flex in response to X-axis movement may be referred to as X-axis flexures, while flexures that flex in response to Y-axis movement may be referred to as Y-axis flexures. Thus, as shown in FIG. 7 micromover 762 is in its equilibrium position, and the flexures of suspension unit 768a are thus in an unflexed, or undeformed state. Application of a force having an X-axis component displaces frame 758 relative to micromover 762 so that flexures 772a and 774a resiliently deform, while flexure 770a remains in an undeformed state because the applied force has no Y-axis component. Thus, flexures 772a and 774a are acting as X-axis flexures. Likewise application of a force having a Y-axis component displaces the frame relative to the micromover so that flexure 770a is resiliently deformed while 772a and 774a remain undeformed (because the applied force does not have an X-axis component). Thus, flexure 770a is acting as a Y-axis flexure.

It should be appreciated that the suspension units 768a-d are arranged symmetrically about micromover 762 so that half of the micromover flexures and half of the frame flexures resiliently deform in response to displacement of the micromover in the X-direction, while the remaining flexures resiliently deform in response to displacement of the micromover in the Y direction. This configuration provides substantial similarity in the aggregate flexural stiffness of the suspension along the X and Y axes. Although FIG. 7 illustrates the use of a single flexure structure at a given location, for example 772a connected between coupling member 776a and micromover 762, it should be appreciated that other embodiments may employ multiple flexures. The particular number of flexures will depend on various factors such as the desired stiffness, the range of motion desired, and the number of data storage locations addressed by each conductive gate. In addition, it should also be appreciated that any suitable micromover mechanism also may be utilized in alternate embodiments of the present invention. For example, piezoelectric actuators or movers and electrostatic comb-drive actuators also may be utilized.

Figure 8:
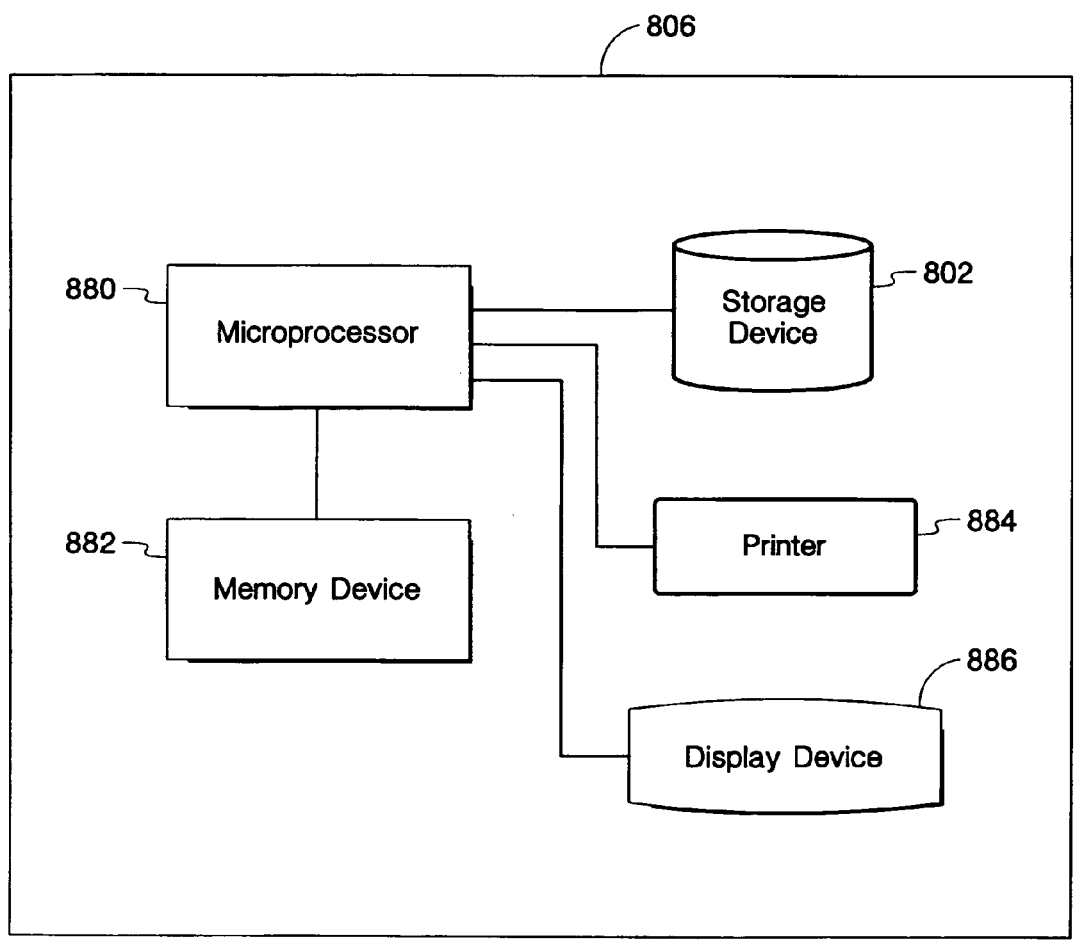
FIG. 8 is a block diagram of computer system according to an embodiment of this invention.

An electronic device 806, such as a computer system, video game, Internet appliance, terminal, MP3 player, cellular phone, or personal digital assistant to name just a few is shown, in a block diagram, in FIG. 8. Electronic device 806 includes microprocessor 880, such as an Intel processor sold under the name "Pentium Processor," or compatible processor. Many other processors exist and also may be utilized. Microprocessor 880 is electrically coupled to a memory device 882 that includes processor readable memory that is capable of holding computer executable commands or instructions used by the microprocessor 880 to control data, input/output functions, or both. Memory device 882 also may store data that is manipulated by microprocessor 880. Microprocessor 880 is also electrically coupled to either one of, to all, or to some combination of storage device 802, printer 884, and display device 886. Microprocessor 880, memory device 882, printer 884, display device 886, and storage device 802 each may contain an embodiment of the present invention as exemplified in earlier described figures and text showing storage devices having a moveable conductive control gate and a charge trapping structure.

Figure 9:
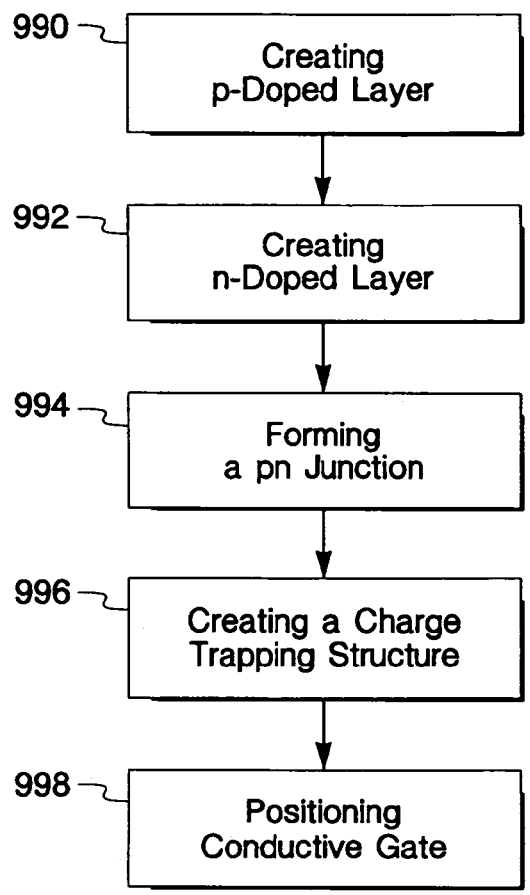
FIG. 9 is a flow chart of a method of manufacturing a storage device according to an embodiment of this invention.

Referring to FIG. 9 a flow diagram of a method of manufacturing a memory storage device, according to an embodiment of the present invention, is shown. P-doped semiconducting layer creating process 990 is utilized to create the p-doped semiconducting layer on a substrate. The particular process utilized will depend on the particular substrate utilized to form the memory storage device. As described above a wide variety of substrates may be utilized to form the storage device. For example, for those embodiments utilizing a p type silicon wafer, and a p+ semiconducting layer is desired, then typically a silicon nitride or oxide or other suitable material is deposited over the substrate and patterned to form a mask having openings of the desired shape of the p-doped region. The particular dopant is then generally implanted, to the desired dose, into the open region of the mask utilizing conventional ion implantation equipment; however, other implantation processes also may be utilized. An annealing step generally follows the dopant implantation process. The particular annealing process is ion-dose and ion-species-dependent. The mask is then removed generally by chemical etching, however, any suitable etching process or layer removable process also may be utilized. For those embodiments utilizing an epitaxial p-doped layer the epitaxial layer may be deposited or grown directly on the substrate or wafer. For those embodiments utilizing a polycrystalline or amorphous p-doped layer the layer may be deposited directly on the substrate utilizing conventional semiconductor processing equipment. In still other embodiments, a p-doped silicon layer on an insulating layer utilizing, typically, an oxide layer formed on a silicon wafer also may be utilized, however other dielectric layers or insulating layers also may be utilized.

N-doped semiconducting layer creating process 992 is utilized to create the n-doped semiconducting layer on a substrate. Any of the processes described above for creating the p-doped layer also may be utilized to form the n-doped layer. For example, for those embodiments utilizing a p type silicon wafer, and a p+ semiconducting layer as described above another oxide or nitride mask may be deposited and patterned to form a mask having openings of the desired shape of the n-doped region. The doping process is then performed and the mask is then removed. Another example is for those embodiments utilizing an epitaxially grown p-doped layer. The particular dopant material may be gradually or abruptly changed, depending on the desired junction characteristics, to switch from growing a p-doped layer to an n-doped layer. Optional pn junction forming process 994 is utilized to form a pn junction for those embodiments where the creation of the p- and n-doped layers does not result in the desired junction formation during creation of the layers. For example, an additional annealing step may be desired.

Charge trapping storage structure creation process 996 is utilized to create the charge trapping storage structure in which data storage locations will be generated. The particular process utilized will depend on the particular type of charge trapping storage structure utilized in the memory storage device. For example, for those embodiments utilizing an oxide-nitride-oxide layered structure, the dielectric layers may be deposited utilizing various deposition techniques such as plasma enhanced chemical vapor deposition (PECVD), atmospheric or low pressure chemical vapor deposition, sputter deposition, or other suitable deposition technique. All three layers may be deposited sequentially before defining and forming the desired structure or each layer may be deposited and then defined and etched before the next layer is deposited. The structure definition and etching processes typically utilize conventional photolithography and etching equipment. For those embodiments utilizing a polymer or organic dielectric layer spin coating, curtain coating, or other suitable coating techniques also may be utilized to form a polymer dielectric layer such as polyimides, or benzocyclobutene to name just a couple of examples. Another example is for those embodiments utilizing germanium nano-particles dispersed within a silicon oxide medium to for the charge trapping storage structure. Typically, a silicon oxide film, on the order of about 4 nanometers in thickness, is deposited on the n-doped semiconducting layer utilizing various deposition techniques such as plasma enhanced chemical vapor deposition (PECVD), atmospheric or low pressure chemical vapor deposition, sputter deposition, or other suitable deposition technique. In addition a silicon film also may be deposited followed by thermal oxidation, for example using dry oxygen at 950° C. for about 5 minutes. Germanium is deposited on the silicon oxide surface to a thickness of about 10 nanometers utilizing any of the conventional deposition techniques such as electron-beam or thermal evaporation or sputter deposition. The substrate with the germanium deposited onto the silicon oxide surface is then annealed in the range of from about 800° C. to about 1000° C. for about an hour under a dry oxygen ambient. Gold and other nanoparticles dispersed within a dielectric layer also may be formed in a similar manner of deposition followed by annealing. In addition, co-deposition also may be utilized depending on the particular dielectric medium and nano-particle material utilized.

Conductive gate mounting process 998 is utilized to package or assemble a conductive gate support, a moving layer support and drive support together to form a frame that encloses the conductive gates and charge trapping storage structure. Generally, the moving layer support is connected to a micromover that is mechanically suspended between the conductive gate support and the drive support. In this manner at least one conductive gate is disposed over the charge trapping structure. In addition, either the conductive gate tip or the charge trapping structure moves relative to the other. Typically conductive gate mounting process 998 includes creating a micromover that is coupled to either the conductive gates or to the charge trapping storage structure depending on which structure is to move relative to the other. The micromover may be formed to move in one, two, or three dimensions.

A silicon wafer will be used, as an example, to illustrate a process that may be utilized to form the micromover; however a wide variety of other processes also may be utilized to form the micromover. Typically, a dielectric passivation layer and an etch defining layer are deposited over the silicon substrate. In alternate embodiments, the dielectric passivation layer and the etch defining layer may be deposited during p- or n-doped creation process depending on the particular application in which the storage device will be utilized. Deposition techniques such as plasma enhanced chemical vapor deposition (PECVD), sputter deposition, or chemical vapor deposition may be utilized to deposit refractory dielectrics such as silicon oxide, silicon nitride, or silicon carbide to name just a few examples. In alternate embodiments, spin coating, or curtain coating, also may be utilized to form a polymer dielectric passivation layer such as polyimides, or benzocyclobutenes to name just a couple of examples. After deposition various planarizing processes such as chemical mechanical processing (CMP) may be utilized for those applications desiring a planarized dielectric layer. Typically the etch defining layer is deposited on the back or opposite side of the silicon substrate. In this embodiment, the etch defining layer is a silicon nitride layer, however, in alternate embodiments, other refractory materials such as silicon oxide or silicon carbide or polymeric materials such as an epoxy photo resist or polyimide also may be utilized depending on various parameters such as the particular substrate material utilized as well as the particular etchant or etchants utilized to form the micromover structures. The etch defining layer is then patterned utilizing conventional photolithographic technologies and processes to form openings exposing the underlying substrate. The size and shape of the openings also depends on various parameters such as particular etchant utilized to etch the wafer as well as the wafer or substrate material. In alternate embodiments, the openings also may be formed in the dielectric passivation layer or both.

Micromover creation process is utilized to form, or generally etch, the substrate or wafer and generate the various micromover structures described above. For example, a deep reactive ion dry etch may be used when vertical or orthogonal sidewalls are desired. Alternatively an anistropic wet etch such as potassium hyrdoxide (KOH) may be used to etch a (110) oriented silicon wafer to also produce vertical sidewalls. Further, the use of an anisotropic wet etch such as KOH or tetra methyl ammonium hydroxide (TMAH), may be utilized to etch a (100) oriented silicon wafer to produce various structures with sloped side walls generated by the slower etch rate of the (111) crystallographic planes. In still other embodiments, combinations of wet and dry etch also may be utilized when more complex structures are desired. Further, other processes such as laser ablation, reactive ion etching, ion milling including focused ion beam patterning also may be utilized to form the various micromover structures. After the various micromover structures have been formed portions of the dielectric passivation layer and the etch defining layer may be removed. In this embodiment, the dielectric passivation layer and the etch defining layer remain on a portion of moving layer support to illustrate additional packaging steps, however, in alternate embodiments, these layers may be completely removed or left in selective areas, depending on various parameters such as the desired thermal and electrical isolation properties on various portions of the micro-fabricated device.

In assembling the conductive gate support, moving layer support, and drive support together various processes such as wafer or anodic bonding processes, various solder bonding processes, and adhesive bonding processes may be utilized. For example a gold-silicon eutectic or other lower melting point solder may be formed over the dielectric passivation and etch defining layers deposited over a portion of the moving layer support which is then used to bond the moving layer support to the conductive gate support, the drive support to form the frame that encloses the conductive gates and charge trapping storage structure. In alternate embodiments, various adhesive bonding techniques also may be utilized. And in still other embodiments, techniques such as thermal compression bonding or brazing also may be utilized.

Figure 10:
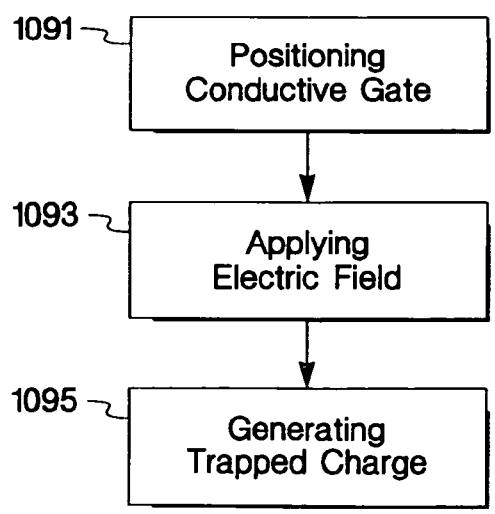
FIG. 10 is a flow chart of a method of using a storage device according to an embodiment of this invention.

A flow diagram of a method of using a memory storage device, according to an embodiment of the present invention, is shown in FIG. 10. Conductive gate position process 1091 is utilized to position the conductive gate tip over a predetermined location of the charge trapping layer. The particular process utilized will depend on the particular type of actuators and micromovers used in the storage device. For those embodiments having a fixed conductive gate and a charge trapping structure disposed on a micromover an electro static actuator may be utilized to generate the forces that move the charge trapping layer in at least one direction. However, other types of actuators also may be utilized such as a piezoelectric actuator. In alternate embodiments, the charge trapping structure may be moved in two or three dimensions. For example, the charge trapping structure may be moved or translated in one direction while generating or writing a data bit, and the charge trapping structure moved or scanned in two dimensions when reading the written data bit. In addition, movement in a third direction to control the distance between the conductive gate tip and the charge trapping structure also may be utilized to provide further control over the writing or reading process. In alternative embodiments, the charge trapping structure may be fixed and the conductive gate tip moved over the surface of the charge trapping structure to both generate and detect a data bit or storage location. As noted above in the embodiment described in FIG. 6b various combinations of groups of conductive gate tips also may be utilized.

Electric field application process 1093 is utilized to apply the desired voltages to the storage device. The particular voltages applied will depend on the particular dopant levels utilized to form the pn junction, the thickness of the n doped region under the charge trapping structure, as well as the distance between the conductive gate tip and the surface of the charge trapping storage structure and the thickness of the charge trapping storage layer. Generally, a positive voltage is applied to the conductive gate tip while the n-doped region is at or near ground potential and the p-doped region is at a negative voltage. For example, the conductive gate tip may be at a voltage of about 15 volts with the n-doped region about zero volts and the p-doped region at −5 volts. However, other voltage levels also may be utilized such as the conductive gate tip held at +20 volts, the n-doped region held at +5 volts and the p-doped region held at about zero volts.

Trapped charge generation process 1095 is utilized generate a data bit or storage location in the charge trapping structure. The electric field generated between the conductive gate tip and the n-doped region locally controls the tunneling of electrons from the n-doped region into a localized region of the charge trapping structure. In one embodiment, the pn junction is operated in a reverse biased mode at or near the avalanche break down region to generate "hot" electrons having sufficient energy to tunnel into the charge trapping storage structure. In alternate embodiments, the pn junction may be operated any mode providing electrons having sufficient energy to tunnel into the charge trapping storage layer. By either keeping the conductive gate tip stationary relative to the charge trapping structure or by moving the conductive gate tip in either one dimension or in a two-dimensional pattern a data bit or storage location may be generated in the charge trapping structure. In one embodiment, the writing or charging process may be self-limiting by holding the applied field constant during a writing event. The trapped charge generates a field that will reduce further electron tunneling resulting in a self-limiting charging process. The particular shape of the generated data bit will depend on the shape of the tip closest to the surface of the charge trapping structure as well as the pattern in which either the conductive gate tip or charge trapping storage structure is moved relative to the other.

The presence or absence of a data bit (i.e. locally trapped charge) may be determined by sensing the difference in capacitance between a charged and uncharged or background location. Erasure or discharge of the of the trapped charge is provided by raising the voltage of the n-doped region to provide for the trapped charge to tunnel back to the n-doped region. The erasure of data bits provides for a block or full erasure or removal of trapped charge in the charge trapping structure.

What is claimed is:

1. A storage device, comprising:
a pn junction disposed in a substrate, said junction having a buried p-doped layer and an n-doped surface layer, a length of the n-doped surface layer extending contiguously along an x-axis from a first x coordinate to a second x coordinate greater than the first x coordinate, and a height of the n-doped surface layer extending along a y-axis, the y-axis perpendicular to the x-axis;
a charge trapping storage structure disposed over said n-doped layer, a length of the charge trapping storage structure extending contiguously along the x-axis from a third x coordinate to a fourth x coordinate greater than the third x coordinate, and a height of the charge trapping storage structure extending along the y-axis, the third x coordinate being greater than the first x coordinate, the fourth x coordinate being less than the second x coordinate; and
a conductive gate, wherein said conductive gate and said charge
trapping storage structure move relative to the other, and wherein an electric field applied across said pn junction and said conductive gate generates trapped charge in said charge trapping storage structure.

2. A storage device, comprising:
a semiconductor junction disposed in a substrate, said semiconductor junction having an n-doped surface layer, a length of the n-doped surface layer extending contiguously along an x-axis from a first x coordinate to a second x coordinate greater than the first x coordinate, and a height of the n-doped surface layer extending along a y-axis, the y-axis perpendicular to the x-axis;
means for trapping charge in a structure disposed on or over said n doped surface layer, a length of the means for trapping charge extending contiguously along the x-axis from a third x coordinate to a fourth x coordinate greater than the third x coordinate, and a height of the means for trapping charge extending along the y-axis, the third x coordinate being greater than the first x coordinate, the fourth x coordinate being less than the second x coordinate; and
means for spatially localizing an electric field, said electric field applied between said n-doped surface layer and said means for spatially localizing an electric field, wherein said means for spatially localizing an electric field and said structure move relative to the other.

3. The storage device in accordance with claim 2, further comprising means for micromoving either said means for spatially localizing an electric field or said structure in at least one direction.

4. The storage device in accordance with claim 2, further comprising means for micromoving either said means for spatially localizing an electric field or said structure in two dimensions.

5. The storage device in accordance with claim 4, wherein said means for micromoving further comprises:
- a frame, wherein said means for micromoving moves relative to said frame; and
- suspension means for mechanically suspending said means for micromoving relative to said frame, permitting planar movement of said means for micromoving relative to said frame substantially preventing out of plane relative movement, said planar movement defined by an X-direction and a Y-direction, said suspension means including:
  - at least one X-axis means for flexing in response to movement of said means for micromoving in the X-direction relative to said frame, and
  - at least one Y-axis means for flexing in response to movement of said means for micromoving in the Y-direction relative to said frame.

6. The storage device in accordance with claim 4, wherein said means for micromoving further comprises:
- a frame, wherein said means for micromoving moves relative to said frame; and
- suspension means for mechanically suspending said means for micromoving relative to said frame, said suspension means having a plurality of suspension subassemblies operatively coupled between said frame and said means for micromoving, each suspension subassembly having at least three means for flexing in response to movement of said means for micromoving including:
  - a first means for flexing secured between a coupling member and said means for micromoving, and
  - a second and a third means for flexing secured between said coupling member and said frame, said second and third means for flexing aligned along a longitudinal axis passing through said first means for flexing.

7. The storage device in accordance with claim 2, wherein said means for trapping charge further comprises means for electrically insulating disposed on said n-doped surface layer.

8. The storage device in accordance with claim 7, wherein said means for electrically insulating further comprises means for interfacially trapping charge.

9. The storage device in accordance with claim 2, wherein said means for trapping charge further comprises means for trapping charge on nano-particles dispersed in a means for electrically insulating, said means for electrically insulating disposed on said n-doped surface layer.

* * * * *

UNITED STATES PATENT AND TRADEMARK OFFICE
CERTIFICATE OF CORRECTION

PATENT NO. : 7,709,882 B2
APPLICATION NO. : 11/255458
DATED : May 4, 2010
INVENTOR(S) : Hang Liao et al.

It is certified that error appears in the above-identified patent and that said Letters Patent is hereby corrected as shown below:

In column 14, lines 35-40, in Claim 1, delete
"a conductive gate, wherein said conductive gate and said
     charge
trapping storage structure move relative to the other, and
     wherein an electric field applied across said pn junction
     and said conductive gate generates trapped charge in
     said charge trapping storage structure." and insert
-- a conductive gate, wherein said conductive gate and said
     charge trapping storage structure move relative to the
     other, and wherein an electric field applied across said
     pn junction and said conductive gate generates trapped
     charge in said charge trapping storage structure. --, therefor.

Signed and Sealed this

Thirty-first Day of August, 2010

David J. Kappos
*Director of the United States Patent and Trademark Office*